A. KWILECKI.
ALBUMINIMETER.
APPLICATION FILED JUNE 21, 1911.
1,056,913.
Patented Mar. 25, 1913.
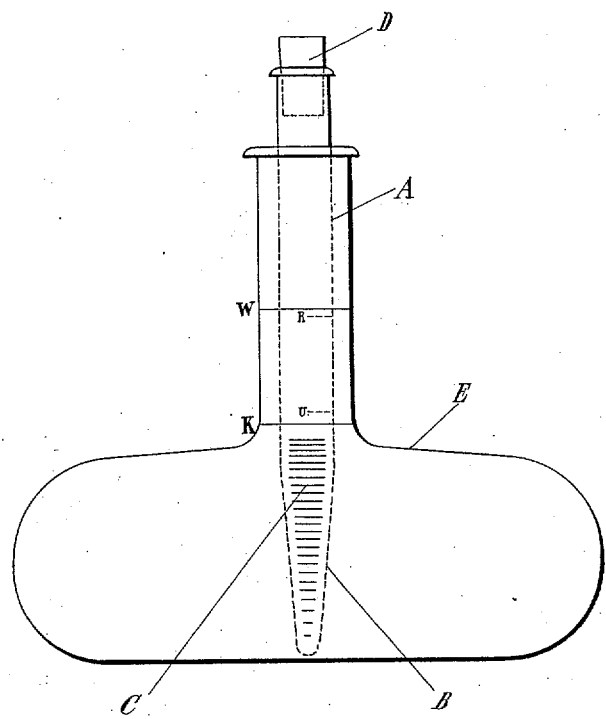

UNITED STATES PATENT OFFICE.

ADOLF KWILECKI, OF BRESLAU, GERMANY.

ALBUMINIMETER.

1,056,913.  Specification of Letters Patent.  Patented Mar. 25, 1913.

Application filed June 21, 1911. Serial No. 634,623.

*To all whom it may concern:*

Be it known that I, ADOLF KWILECKI, a subject of the German Emperor, and residing at Breslau, Germany, have invented certain new and useful Improvements in Albuminimeters, of which the following is a specification.

The present invention relates to an apparatus for determining the amount of albumin in liquids, especially in urine, by means of the so-called Essbach solution or other suitable reagents. With this new device an analysis can be made within 1–2 minutes, whereas with Essbach's albuminimeter and when following his directions it requires from 16–24 hours to do this, since the deposition of the sediment resulting from the throwing-out of the albumin takes place at a very slow rate.

According to the present invention, Essbach's procedure is varied to some extent. Rapid precipitation is obtained by adding a few drops of a ferric chlorid solution to the liquid to be tested prior to the addition of the reagent. The albumin in this instance is then precipitated very rapidly, the test liquid above the sediment appearing clear and translucent, so that the amount of albumin can readily be read off the graduated glass tube in which the test is performed.

For carrying out this process a special form of apparatus is used, which is shown in the accompanying drawing.

The outer vessel, serving as water bath, has the shape of an ampulla, with slender tubular neck and widened bulb-shaped body, and its neck is provided with two marks or graduations. This particular shape of vessel permits of the introduction of a relatively large amount of water, without increasing its height or reducing the length of its neck. By means of the two graduation marks the reaction temperature may readily be determined without the use of a thermometer. The operator is thus able to easily and quickly test for albumin. When testing urine, for instance, it is filled into the inner test tube A, which has the usual shape with tapering lower end B and graduation marks C, up to the mark U; then 10 drops of a ten-per cent. solution of ferric chlorid are admixed, and finally a reagent is poured in up to the mark R. The tube is then corked tightly and the cork D secured in suitable manner, for instance by a wire hoop or the like, and the liquid is then shaken. In the meantime water has been heated in the outer vessel E to a temperature of about 160° Fahr. In order to readily ascertain without the use of a thermometer if the water has come to the requisite temperature, the vessel E is provided with two graduation marks K and W. Water of room-temperature, about 60° Fahr., is filled-in to the mark K and then heated until it has risen to the mark W. This latter is empirically ascertained to correspond to the height of expansion of the water from the lower graduation mark K, with due regard to evaporation, up to the temperature of 160° Fahr. Into this heated water bath the test tube containing the above described mixture is plunged, the hot water rising about four-tenths of an inch above the level of the test liquid. The thrown-out precipitate will immediately sink to the bottom when the percentage of the albumin can directly be read off the scale C.

By giving the outer water container the shape of an ampulla the differences in temperatures can thus plainly be shown without the total height of the container being increased and without the neck being reduced, and a test tube of the customary length can be vertically inserted so that its upper part extends far enough out of the surrounding neck to allow of readliy handling it.

What I claim is:—

1. In an albuminimeter, a combination water-bath and reaction-temperature indicator, comprising a transparent ampulla-shaped receptacle or relatively large diameter and slender neck with two graduation marks on the latter; in combination with a transparent container of a diameter somewhat smaller than that of the neck of said ampulla, and of a length somewhat larger than the total height of the ampulla, and having a series of closely spaced graduation marks on its lower part, and two more widely spaced graduation marks at approximately the height of the said two marks on the ampulla neck.

2. In an albuminimeter, a combination water-bath and reaction-temperature indicator, comprising a transparent, ampulla-shaped receptacle having two graduation marks, one for indicating the height up to which water at about 60° F. is to be filled-in, and the other for indicating when the water has attained a certain reaction temperature; in combination with a removable transparent test tube showing two sets of differently spaced graduation marks.

In testimony whereof I affix my signature in presence of two witnesses.

ADOLF KWILECKI.

Witnesses:
 SIEGFRIED LUSTIG,
 ERNST KATZ.

Copies of this patent may be obtained for five cents each, by addressing the "Commissioner of Patents, Washington, D. C."